(12) United States Patent
Gonzales et al.

(10) Patent No.: US 8,683,430 B2
(45) Date of Patent: Mar. 25, 2014

(54) SYNCHRONIZING DEVELOPMENT CODE AND DEPLOYED EXECUTABLE VERSIONING WITHIN DISTRIBUTED SYSTEMS

(75) Inventors: Jason A. Gonzales, Lewisville, TX (US); Endemecio Santana, Dallas, TX (US); Tassanee K. Supakkul, Euless, TX (US); Janki V. Yora, Dallas, TX (US); Julio Wong, Pembroke Pines, FL (US)

(73) Assignee: International Business Machines Corporation, Armonk, NY (US)

( * ) Notice: Subject to any disclaimer, the term of this patent is extended or adjusted under 35 U.S.C. 154(b) by 533 days.

(21) Appl. No.: 12/986,835

(22) Filed: Jan. 7, 2011

(65) Prior Publication Data

US 2012/0180024 A1    Jul. 12, 2012

(51) Int. Cl.
*G06F 9/44* (2006.01)
*G06F 3/048* (2013.01)

(52) U.S. Cl.
USPC ........... 717/109; 717/123; 717/124; 717/125; 715/763

(58) Field of Classification Search
None
See application file for complete search history.

(56) References Cited

U.S. PATENT DOCUMENTS

| | | | |
|---|---|---|---|
| 7,076,496 B1 | 7/2006 | Ruizandrade | |
| 7,159,185 B1 * | 1/2007 | Vedula et al. | 715/763 |
| 7,231,633 B2 * | 6/2007 | Grassens | 717/124 |
| 7,272,820 B2 * | 9/2007 | Klianev | 717/109 |
| 7,392,510 B1 * | 6/2008 | Treder et al. | 717/128 |
| 7,437,717 B1 * | 10/2008 | Cowan et al. | 717/131 |
| 7,516,445 B2 * | 4/2009 | Maennel et al. | 717/125 |
| 7,606,820 B2 | 10/2009 | Stienhans et al. | |
| 7,877,731 B2 * | 1/2011 | Bekelman | 717/123 |
| 7,945,894 B2 * | 5/2011 | Peck et al. | 717/109 |
| 2005/0114837 A1 * | 5/2005 | Blumenthal et al. | 717/124 |
| 2006/0282479 A1 | 12/2006 | Johnson et al. | |
| 2010/0125828 A1 * | 5/2010 | Vasista | 717/109 |
| 2010/0153929 A1 * | 6/2010 | Porras et al. | 717/139 |
| 2010/0257515 A1 * | 10/2010 | Bates et al. | 717/145 |
| 2010/0293533 A1 * | 11/2010 | Andrade et al. | 717/140 |
| 2011/0047531 A1 * | 2/2011 | Wang | 717/130 |
| 2011/0099538 A1 * | 4/2011 | Naidu Pujala et al. | 717/124 |
| 2012/0131547 A1 * | 5/2012 | Muir | 717/109 |

OTHER PUBLICATIONS

Amitabh Srivastava et al., "Effectively Prioritizing Tests in Development Environment"[Online], ACM 2002, pp. 97-106, [Retrieved from Internet on Oct. 20, 2013], < http://utopia.csis.pace.edu/dps/2007/jkile/content/2005-fall/dcs860b/classification/original%20papers/p97-srivastava.pdf>.*

(Continued)

*Primary Examiner* — Thuy Dao
*Assistant Examiner* — Ziaul A Chowdhury
(74) *Attorney, Agent, or Firm* — Patents On Demand P.A.; Brian K. Buchheit; Scott M. Garrett

(57) ABSTRACT

The disclosure provides a solution for associating deployed executables with source code. In the solution, source code of a development environment can be mapped to a deployed executable of a runtime environment. The mapping can ensure that a version of source code from which the deployed executable was produced is always known. The mapping can occur within digitally encoded data stored in a non-transient storage medium. The development environment and the runtime environment can be two distinct and separate computing environments that are isolated from each other.

19 Claims, 3 Drawing Sheets

(56) References Cited

OTHER PUBLICATIONS

Qiang Tu et alo., "Modelling and Extracting the Build-Time Software Architecture View", [Online], IEEE 2001, pp. 1-13, [Retrieved from Internet on Oct. 20, 2013], <http://plg.uwaterloo.ca/~migod/papers/2003/btv-ase03.pdf>.*

Jeffrey C. Carver et al., "Software Development Environments for Scientific and Engineering Software: A Series of Case Studies", [Online], IEEE 2007, pp. 1-10, [Retrieved from Internet on Oct. 20, 2013], <http://carver.cs.ua.edu/papers/conference/2007/2007_icse.pdf>.*

Jarle Hansen et al., "Android vs Windows Mobile vs Java ME A comparative Study of Mobile Development Environments", [Online], ACM 2010, pp. 1-8, [Retrieved from Internet on Oct. 20, 2013], <http://delivery.acm.org/10.1145/1840000/1839348/a45-gronli.pdf>.*

* cited by examiner

SYNCHRONIZING DEVELOPMENT CODE AND DEPLOYED EXECUTABLE VERSIONING WITHIN DISTRIBUTED SYSTEMS

BACKGROUND

The present invention relates to the field of software development and, more particularly, to synchronizing development code and deployed executable versioning within distributed systems.

A common problem within distributed systems can be the inability to easily identify which artifact versions correspond to each other between development and runtime environments. That is, the relationship between a version of source code in development and the deployed executable (e.g., runtime executable) can be unknown. This can result in synchronization problems during development and deployment. One such problem can include source code overwriting incorrect versions of the executable within a runtime environment (e.g., production system) after deployment.

In one scenario, developer A can work in a development environment performing changes to source code that was deployed to a runtime environment while developer B can also enact different changes to the same code. Either developer can deploy the updated code with his/her changes at any time. Before deploying any changes, he/she may want to know which version of code is currently running and to ensure whether it is based off of the same version of code being deployed.

Currently there is no viable solution for a developer to retrieve such information that can be used to help manage different versions of source code being developed and deployed. Therefore, if developer B has already deployed his/her changes first, developer A can potentially overwrite developer B's changes.

The problem can be exacerbated when the source code corresponding to the deployed executable cannot be identified nor located. This can occur when a developer performs changes to source code which is deployed to a runtime system and does not make the source code available. Further, when the currently running version of a product requires changes, it can be difficult to determine which version of the source code is associated with the running version of the product. Additionally, obtaining the appropriate version of the source code can be difficult when the source code developer is not available.

Known solutions which are currently employed include requiring developers to manually contact each other to determine which version of the executing product is associated with a version of the source code. One drawback to this approach is the time delay that can occur between developer interactions. For example, when a developer is temporarily unavailable for contact, determining corresponding source code versions to a product can be delayed.

Another approach includes developers manually comparing source code in a development environment with executables in a runtime environment. In some instances of this approach, source code must be compared against multiple executables in multiple runtime environments. This approach also suffers from high levels of complexity, considerable temporal delays, and is error-prone. For example, a developer is required to compare all files of all types (e.g., text, binary, etc.), traverse through directory structures, and use appropriate criteria (e.g., size, content, timestamp, etc.) to determine a corresponding source code version for a runtime executable. In many instances, deployed systems can vary significantly from development systems disallowing automation of this process.

SUMMARY

One aspect of the disclosure can be for a solution for associating deployed executables with source code. In the solution, source code of a development environment can be mapped to a deployed executable of a runtime environment. The mapping can ensure that a version of source code from which the deployed executable was produced is always known. The mapping can occur within digitally encoded data stored in a non-transient storage medium. The development environment and the runtime environment can be two distinct and separate computing environments that are isolated from each other.

Another aspect of the disclosure can be for a system for synchronizing distributed systems. The system can include a versioning engine able to version source code of a development environment and able to map the versions of source code to versions of deployed executables of a runtime environment. Each of the versions of the deployed executables can be generated from the version of the source code to which it is mapped. The development environment and the runtime environment can be two distinct and separate computing environments that are isolated from each other.

DETAILED DESCRIPTION

Figure 1:
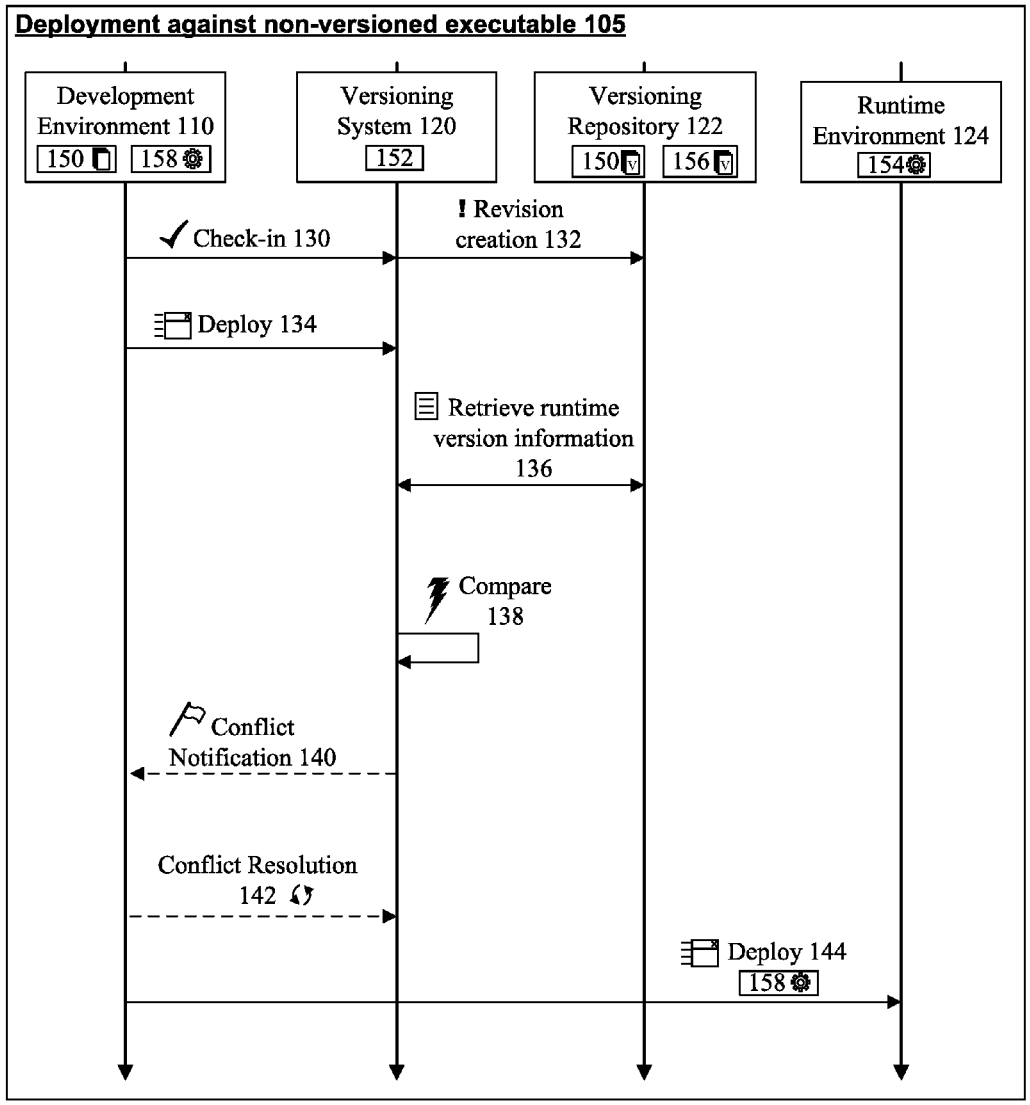
FIG. 1 is a schematic diagram illustrating a process flow 100 for synchronizing development code and deployed executable versioning within distributed systems in accordance with an embodiment of the inventive arrangements disclosed herein.

The present disclosure is a solution for synchronizing development code and deployed executable versioning within distributed systems. A deployed executable can refer to an executable program able to execute in a production environment. Development code can include source code, which is human readable code from which the deployed executable was generated. The deployed executable can be machine generated code such as binary code, bytecode, etc. The source code maintained in a development environment can be mapped to the deployed executable, where this mapping ensures that the version of the source code from which the deployed executable was produced is always known. In one embodiment, the mapping can be performed by metadata of the deployed executable. Versioning functions performable in various embodiment of the solution include, but are not limited to, import, export, deploy, difference comparison, synchronization, conflict resolution, and other such functions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, for instance, via optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction processing system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

FIG. 1 is a schematic diagram illustrating a process flow 100 for synchronizing development code 150 and a corresponding deployed executable 158 in accordance with an embodiment of the inventive arrangements disclosed herein. Process flow 100 involves a development environment 110 and a runtime environment 124, which are two distinct and separate computing environments that are intentionally isolated from each other. The runtime environment 124 can also be referred to as a production environment, live environment, or real-world environment, which is the computing environment within which the deployed executable is operationally utilized. The development environment 110 can be a computing environment within which developers produce and test software artifacts, such as the development code 150. The development code 150 can include source code 152 and one or more development executables 154, both of which can be under configuration management and/or can be version controlled. Source code 152 can refer to human readable code, such as text-based code written by a software developer via a code editor. Source code 152 is able to be printed to paper and understood by a human familiar with the code language (e.g., C, JAVA, XML, etc.) of the source code 152.

In process flow 100, a versioning system 120 can maintain a version controlled version of a set of files 156 of the development documents 150 in versioning repository 122. The files 156 of repository 122 can correspond to source code 152 and related artifacts, such as development executables 154, design documents, user manuals, training materials, configuration files, and the like. Development executables 154 can be machine readable artifacts (e.g., binaries, bytecode, etc) generated from the source code 152. In one embodiment, the versioned files 156 can be mapped to the deployed executables 158. For example, the deployed executables 158 can include metadata that ensures that the version of source code 152 from which the executable 158 was produced is always known. It should be appreciated that traditional synchronization techniques do not permit real-time user transparent concurrency of development code and deployed executables which the disclosure provides.

As used herein, runtime environment 124 can be a deployment system which can include, but is not limited to, a local workspace environment (e.g., desktop environment), virtual machine environment, continuous integration build environment, test environment, staging environment, and the like. In one instance, environment 124 can be a JAVA 2 ENTERPRISE EDITION runtime environment.

Deployed executable 158 can be an executable code comprising of machine code instructions for performing programmatic actions within runtime environment 124. Deployed executable 158 can include compiled code, interpreted code, and the like. For instance, deployed executable 158 can be a binary file of a software application. In one embodiment, deployed executable 158 can be associated with deployed artifacts including, but not limited to, configuration files, archives, and the like. Deployed executable 158 can be linked to a corresponding file 156 of repository 122 maintained in a version controlled manner by versioning system 120.

As used herein, development environment 110 can include, but is not limited to, a local workspace environment (e.g., desktop environment), virtual machine environment, an integrated development environment, a distributed development environment utilized concurrently by a set of distributed developers, and the like. The development executable 154 can be generated from source code 152 for environment 110. Environment specific variables, libraries, pointers, file locations, platform specifics, and the like can differ from the development environment 110 and the runtime environment 124, which can result in the deployment executable 154 being different from the corresponding deployed executable 158; each customized to function in their specific environment.

It should be appreciated that the disclosure presents a solution that can assist developers during integration testing where frequent deployment of executables upon a runtime environment is common. As such, revisions of deployed executable 158 within runtime environments 124 can be in constant flux and can result in unsynchronized development systems and deployment systems. Additionally, the disclosure can permit synchronization of development and deployment systems in the absence of best practices.

In the scenario deployment against non-versioned executable 105, deployed executable 158 can be linked with a corresponding set of one or more files 156, which can be automatically revisioned. Each file 156 can represent a document or artifact that is under configuration control, which has been versioned by system 120. In one embodiment, metadata can be generated and/or updated upon revisioning of each versioned file 156. The metadata can be associated with the deployed file 158 or maintained separate from it by the versioning system 120. Metadata can include, but not limited to, associated source code files or links to a stored location of the source code files 152, links to associated files 156 and/or records of repository 122, associated source code location information, build information, deployment information (e.g., runtime environment 124 information), and the like.

In the scenario 105, synchronization of development code 150 and deployed executable 158 can occur in response to one or more change management actions. Change management actions can include, but are not limited to, a check-in action, a check-out action, a deployment action, source code import, source code export, build automation processes, and the like. Versioning system 120 can be comprised of versioning server and/or versioning client which can provide the novel change management functionality described herein. For example, system 120 can be comprised of a synchronization server able to track deployed executable versioning within runtime environment 124. System 120 can also include a synchronization server able to track changes to development code 150 of the development environment 110, and to indicate a manner in which these changes relate to managed files 156.

As shown, a check-in 130 change management action can trigger versioning tracking for the development code 150. This can include tracking for source code 152 and/or deployment executable 154. When the check-in action 130 occurs, revision creation 132 event can be triggered. Revision creation event 132 can include creating a new version of development code 150 associated with check-in action 130 within repository 122. This version can be stored as a versioned file 156. The creation of the new version file can result in versioning system 120 creating and/or updating mapping data, which maps the file (or record) 156 to deployed executables 158, if any exist. Although not shown, additional events and/or programmatic triggers can be established for updating mappings based on suitable events, such as compiling source code 152, generating bytecode from source code 152, updating a version controlled version of source code 152, generating a new version of a development executable 154 or deployment executable 158, etc. In an embodiment where metadata associated with deployed executables 158 is used, this metadata can be updated automatically responsive to the above changes.

One or more pre-deployment actions 134 can be triggered from development environment 110, which versioning system 120 can respond to. A pre-deployment action can, for example, check to ensure that changes have not occurred within the runtime environment 124, which would negatively affect deployment of a development executable 154. Towards this end, runtime version information 136 can be retrieved from the repository 122. It should be noted that versioning system 120 can monitor runtime environment 124 and maintain current information about it in repository 122, as previously noted. Thus, the information retrieved by action 136 can represent an accurate picture of environment 124. In compare action 138, versioning system 120 can compute a delta between development code 150 and files (records) 156. It can also compute delta's between files 156 and deployed executables 158, if any. In one embodiment, significant differences between development environment 110 and runtime environment 124 (where significant differences are ones effecting the generation of an executable for that environment from the source code 152) can also be noted. The computed delta(s) can be utilized to identify version conflicts between the development code 150, files 156, and/or deployed executables 158. Conflicts can include, for example, revision differences, feature differences, branch discrepancies, software errors, and the like.

When conflicts are identified, conflict notification 140 can be communicated to appropriate system components and/or users. In one instance, conflict resolution action 142 can be performed programmatically through the use of one or more conflict resolution policies associated with system 120 and/or repository 122. In another instance, conflict resolution 142 action can be performed manually via directed user input. For example, a user can be presented with a set of conflicts which can be manually resolved or ignored. Changes associated with the conflict resolution 142 operation can be propagated to system 120 and repository 122. Notification 140 can additionally permit deployment options to be configured for development code 150. Deployment options can include, but are not limited to, installation options, notification options, and the like. For example, in one embodiment, a user can configure development executable 154 to be installed within runtime environment 124 without negatively affecting deployed executable 158.

Changes which modify development code 150 can be recorded and versioning information can be updated in response to the changes effectuated by versioning system 120. For example, when development code 150 has changed and is used to update one or more corresponding files 156 or records, the version of file 156 can be incremented. When this happens, metadata used to keep source code 152 synchronized with deployed executables 158 of runtime environment 124 can be updated to reflect the change. The updating of metadata can occur immediately, or can occur after an appreciable delay, such as when a next monitoring action is run by system 120 depending on implementation choices.

Once changes are committed to repository 122, development code 150 can be deployed, as shown by deploy event 144. Deploy event 144 can install development executable 158 within runtime environment 124. Upon completion of the development executable 158 installation, versioning information can be communicated from runtime environment 124 to system 120.

Drawings presented herein are for illustrative purposes only and should not be construed to limit the invention in any regard. Process 100 illustrates one possible scenario for synchronizing source code and deployed executables utilizing system 120; other scenarios are contemplated.

It should be understood that versioning system 120 and versioning repository 122 can be combined into a single computing element. In one embodiment, versioning system 120 can provide functionality which can be integrated within an integrated development environment (IDE), repository 122, workspace management tool, build automation tool, deploy tool, software change management tool, and the like. In one instance, system 120 can be a network element able to communicate with versioning repository 122, runtime environment 124, and/or user workspaces. In one embodiment, metadata associated with the deployed executable can include tracking information that maps back to the development documents 150, such as source code 152; in which case the versioning system 120 and versioning repository 122 are not necessarily present or needed to implement features described herein.

Figure 2:
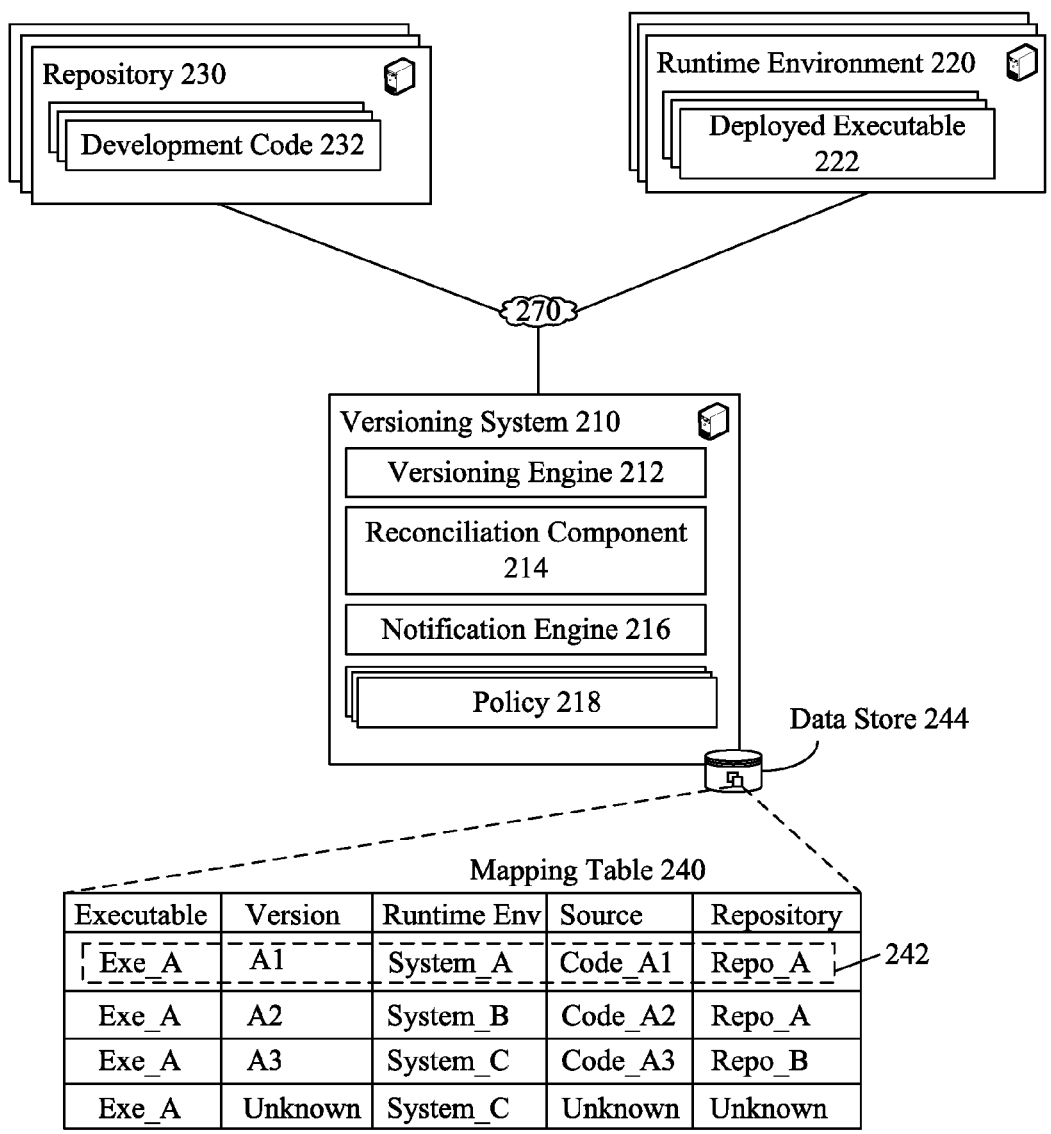
FIG. 2 is a schematic diagram illustrating a system 200 for synchronizing development code and deployed executable versioning within distributed systems in accordance with an embodiment of the inventive arrangements disclosed herein.

FIG. 2 is a schematic diagram illustrating a system 200 for synchronizing development code and deployed executable versioning within distributed systems in accordance with an embodiment of the inventive arrangements disclosed herein. In system 200, a versioning system 210 can provide synchronization functionality for a distributed environment comprising of development (e.g., repository 230) and deployment environments (e.g., environment 220). Versioning system 210 can be communicatively linked to repository 230 and runtime environment 220 via network 270. Network 270 can include, but is not limited to, intranet, extranet, VPN, the Internet, and the like. It should be appreciated that system 200 can support specific integration testing methodologies including, but not limited to, top-down, bottom-up, big bang, sandwich, critical piece first, and the like.

As used herein, system 200 can be a distributed computing environment comprising of one or more components 220, 230. Distributed computing environment can be comprised of computing elements including server entities, client elements, and the like. In one configuration, system 200 can be organized into one or more cells comprising of one or more nodes. As used herein, nodes can refer to a computing device including, but not limited to, desktop computing devices, mobile computing devices, server computing elements, and the like.

Repository 230 can be a hardware/software component able to store development code 232 and/or deployed executables. Repository 230 can include, but is not limited to, source code repository, repository clone, directory structure, and the like. In one instance, repository 230 can be a source code repository including, but not limited to, SUBVERSION, Concurrent Versioning System, and the like. In one instance, repository 230 can be a clone repository common with distributed revision control. In another instance, repository 230 can be synchronized (e.g., cloned and updated) utilizing identical mechanisms for traditional repositories.

Mapping table 240 stored within data store 244 can permit automated version tracking across multiple distributed development and deployment environments. Table 240 can be comprised of deployment metadata which can link development code and deployed executable with a deployment environment. Deployment metadata can conform to one or more traditional and/or proprietary formats including, but not limited to, Extensible Markup Language (XML), Standard Generalized Markup Language (SGML), and the like.

In one configuration of table 240, a deployed executable can be mapped to an associated code (e.g. deployed executable source code), deployment environment, repository storing associated code, and the like. For example, deployment metadata 242 can indicate an executable Exe_A version (e.g., version A1), deployment environment (e.g., System_A), associated source (Code_A1), and associated source repository (Repo_A). That is, mapping table 240 can provide facile and extensible means for deployment version tracking In one instance, mapping table 240 can be continually and automatically updated during a development and deployment software cycle. In another instance, system 200 functionality can be integrated into development tools and/or automated build tools which can automatically update table 240 during development and/or deployment actions. For example, when a new version of an executable is deployed, deployment metadata can be amended in table 240.

Versioning system 210 can be a hardware/software component for enabling synchronization of distributed development and deployment environments. System 210 can be comprised of, but is not limited to, versioning engine 212, reconciliation component 214, notification engine 216, policy 218, data store 244, and the like. In one instance, system 210 can be a component of a software change management system. For example, system 210 can be an IBM TIVOLI CHANGE AND CONFIGURATION MANAGEMENT DATABASE (CCMDB).

System 210 can be configured to function in a variety of scenarios including full synchronization, partial synchronization, and the like. For instance, specific development and/or deployment environments within a cell can be selected to participate in synchronization, enabling customized synchronization profiles. In one embodiment, synchronization can include branch synchronization, file synchronization, directory synchronization, and the like.

System 210 can support deployment and/or administrative related tasks including deployment actions, administrative actions, and the like. System 210 can permit adding, deleting, and/or configuring of deployment environments, development environment, and the like. In one embodiment, system 210 can be configured to automatically detect and register development environments, deployment environments (e.g., runtime 220), and the like. In another embodiment, system 210 can permit manual registration configuration of development environments and/or deployment environments.

System 210 can enable auditing actions to be performed including revision tracking of development code 232 and deployed executable 222 via mapping table 240. For example, system 210 can enable viewing version and history of deployed executables within an arbitrary number of deployment and/or development environments. In one embodiment, system 210 can enable exporting of development source and/or deployment executables. In the embodiment, relevant metadata 240 can be packaged within development source and/or deployment executables which can be stored to a user-defined location.

Versioning engine 212 can be a hardware/software component for tracking deployed executable 222 and associated source code within system 200. Versioning engine 212 can be used to identify and locate development source 232 associated with deployed executable 222 within runtime environment 220. In one instance, versioning engine 212 can produce version history information associated with a deployed executable which can be stored within mapping table 240. Versioning engine 212 can utilize timestamp information, location information, build information to determine and/or verify versioning information. In one embodiment, versioning engine 212 can enable registration of development and deployment environments. In the embodiment, versioning engine 212 can determine unregistered environments utilizing table 240 data and automatically register development and deployment environments.

Reconciliation component 214 can be a hardware/software component for synchronizing development (e.g., repository 230) and deployment systems (e.g., runtime environment 220). Component 214 can utilize one or more traditional and/or proprietary algorithms for conflict resolution. In one instance, component 214 can utilize push/pull mechanisms to perform synchronization. For instance, source code within repository 230 can be refreshed via pulling deployed executable 154 code to a development system 110 to repository 230. In one embodiment, component 214 can utilize policy 218 to perform conflict resolution. In the embodiment, policy 218 can be a heuristically determined policy and/or manually established policy.

Notification engine 216 can be a hardware/software component responsive to change management events and/or synchronization events. Engine 216 can be triggered by a user initiated action and/or by an automated action. Triggers can include, but are not limited to, development code and/or deployed executable import, export, check-in, check-out, deployment, and the like. Engine 216 can communicate with one or more local and/or remote components to permit realtime synchronicity between development and deployment systems. For instance, when a change occurs within a runtime environment, change information can be communicated to relevant entities affected by the change. Engine 216 can convey user notifications conforming to a pop-up dialog, electronic mail, Short Message Service (SMS), Instant Message (IM), log message, and the like. In one instance, user notifications can permit one or more resolution actions to be performed manually and/or automatically.

Policy 218 can be one or more rules affecting the behavior of system 210 and constituent components. Rules can include, but are not limited to, conflict resolution policies, auditing rules, security policies, synchronization rules, metric collection rules, and the like. In one embodiment, policy 218 can support role based policies, user based policies, and the like. Policy 218 can enable customizable synchronization triggers, synchronization options, and the like. For instance, policy 218 can establish operating parameters for tracking the version of an application with uncommitted source code.

The drawings presented herein are for illustrative purposes only and should not be construed to limit the invention in any regard. System 210 functionality can be a component of a middleware software, Web service, and the like. System 200 can utilize traditional and/or proprietary communication mechanisms for synchronizing environment 220 and repository 230. Communication mechanisms can include communication protocols including, but not limited to, Hypertext Transport Protocol (HTTP), HTTP Secure (HTTPS), File Transfer Protocol (FTP), Secure File Transfer Protocol (SFTP), Transport Control Protocol/Internet Protocol (TCP/IP), and the like.

In one instance, deployment metadata can be stored within a secured environment to ensure data integrity is maintained. In another instance, authentication and/or encryption mechanisms can be employed to secure deployment metadata stored within data store 244. System 200 can support traditional enterprise security models including, but not limited to, Public Key Infrastructure (PKI), key based cryptography, security tokens, and the like. Authentication mechanisms for utilizing system 200 functionality can include, but is not limited to, passwords, biometrics, and the like.

In one instance, system 200 can be a portion of a Service Oriented Architecture (SOA). In another instance, system 200 can be a functionality present within an application programming interface. In one embodiment, system 200 can support Web-based Distributed Authoring and Versioning (WebDAV) operations. In the embodiment, system 200 can synchronize development and deployment environments via WebDAV application programming interfaces (APIs). In another embodiment, system 200 can utilize a Representational State Transfer (REST) software architecture.

It should be appreciated that system 200 can vary based on implementation requirements of enterprise systems and/or distributed environments. In one embodiment, versioning system 210 can be comprised of client-server components such as a versioning server and/or a versioning client permitting compartmentalization of functionality. In another embodiment, versioning system 210 can be comprised of a versioning repository. In the embodiment, a versioning repository can be used to store development source 232, deployed code 222, metadata 240, and the like.

In one instance, change management information can be utilized to enable version tracking Change management information can include, but is not limited to, source code information (e.g., owner/group), versioning information, build information, bug tracking information, project information, and the like. For example, metadata obtained from build automation tools can be used to determine the version a deployed executable.

Figure 3:
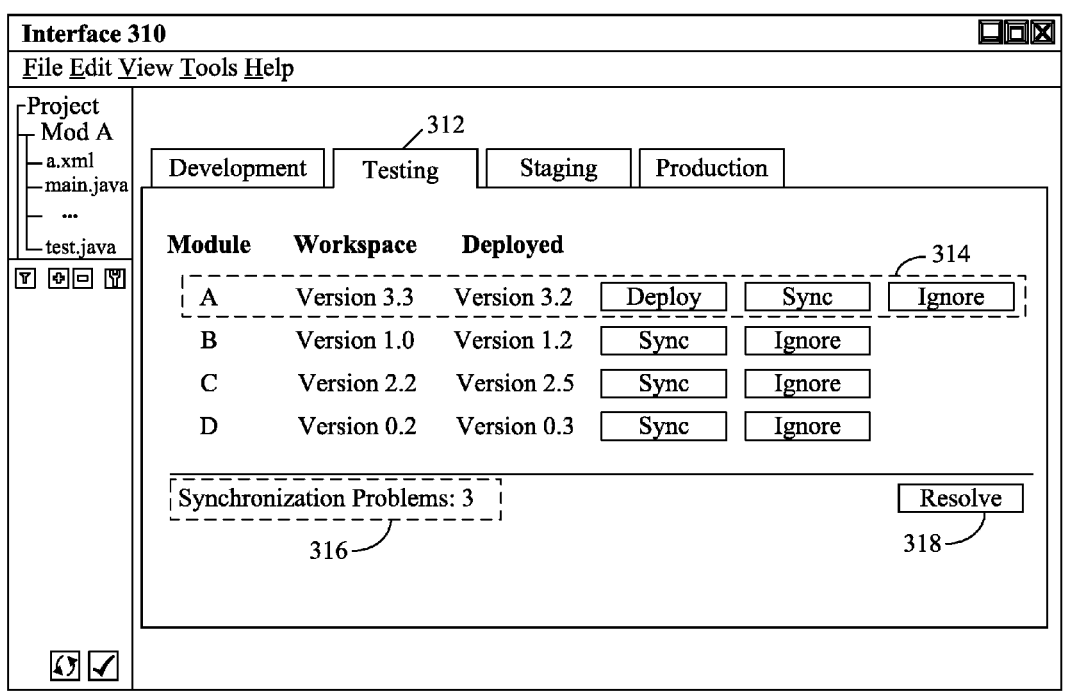
FIG. 3 is a schematic diagram illustrating an interface 300 for synchronizing development code and deployed executable versioning within distributed systems in accordance with an embodiment of the inventive arrangements disclosed herein.

FIG. 3 is a schematic diagram illustrating an interface 310 for synchronizing development code and deployed executable versioning within distributed systems in accordance with an embodiment of the inventive arrangements disclosed herein. In interface 310, version management options for one or more registered development and/or deployment environments can be presented within the interface. Interface 310 can permit organization and management of multiple distributed platforms during the software development and/or deployment process. For instance, multiple tabs (e.g., tab 312) can be presented within interface 310 to enable a phase-based configuration management for synchronization. In one embodiment, interface 310 can be a component of an IBM ECLIPSE integrated development environment (IDE). In the embodiment, interface 310 can automatically register development code and/or deployment executables (e.g. modules) based on project information associated with the IDE.

In one instance, interface 310 can be a user interface associated with a IBM WEBSPHERE APPLICATION SERVER ADMINISTRATIVE CONSOLE. In another instance, interface 310 can permit synchronization configuration of individual nodes, cells, and the like.

In interface 310, version synchronization parameters can be presented based on the selected tab 312. Tab 312 can present modules, workspace environments, deployed environments, and the like. Tab 312 can present interface artifacts for synchronizing presented modules including, but not limited to, deploy, synchronize, ignore, view, and the like. Presented interface artifacts can vary depending on module permissions, user permissions, group permissions, and the like. For instance, an owner of module A can be presented with a deploy push-button enabling synchronized deployment of module A.

In interface 310, synchronization notifications of registered and/or unregistered development and deployment environments can be presented within section 316. For example, section 316 can display one or more deployment environments which are not synchronized with a target development environment. In one instance, section 316 can present realtime notifications of registered environments.

Interface 310 can permit batch synchronization processes to be performed rapidly. In one embodiment, interface push-button 318 can be presented when synchronization incompatibilities are determined. In the embodiment, user interaction with push-button 318 can permit simultaneous synchronization of all registered development and deployment environments. In another instance, interface push-button 318 can permit selective reconciliation actions to be enacted against one or more target environments.

Drawings presented herein are for illustrative purposes only and should not be construed to limit the invention in any regard. Functionality associated with interface 310 can be a portion of a drop-down menu, context menu, and the like. Interface artifacts can include, but are not limited to, checkboxes, radio buttons, interactive push-buttons, and the like. Interface 310 can include, but is not limited to, a graphical user interface (GUI), voice user interface (VUI), mixed-mode interface, text-based interface, and the like.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method executable by a central processing unit (CPU) for associating deployed executables with source code comprising, the method comprising:
    mapping source code of a development environment to a deployed executable of a runtime environment, wherein the mapping ensures that a version of the source code from which the deployed executable was produced is always known, wherein the mapping occurs within digitally encoded data stored in a non-transient storage medium, and wherein the development environment and the runtime environment are two distinct and separate computing environments that are isolated from each other;
    linking the deployed executable to a set of one or more files, wherein the set of one or more files correspond to versioned documents of the source code;
    recording one or more updated versions of the source code, wherein the one or more updated versions of the source code are resulted due to changes in the source code within the development environment;
    computing differences between the one or more updated versions of the source code and the set of one or more files;
    identifying version conflicts between the source code and the deployed executable based on the computing; and
    synchronizing changes between the development environment and the deployed executable so that changes relating to the source code and the deployed executable are maintained in the digitally encoded data, which is automatically updated as the synchronized changes are made.

2. The method of claim 1, further comprising:
    permitting, via a user interface of a computing device, at least one user to query source code and deployed executable mappings, wherein at least one user is able to query for the mappings from both the development environment and the runtime environment.

3. The method of claim 1, further comprising:
    storing a change history within the digitally encoded data, wherein the change history comprises source code versioning information and corresponding deployment executable versioning information.

4. The method of claim 1, wherein the source code is human readable code written in text in accordance with a computer program language, wherein the deployed executable is machine readable code able to perform a set of tasks according to encoded instructions when run by a machine.

5. The method of claim 1, wherein the source code is able to be compiled by a compiler to produce the deployed executable.

6. The method of claim 1, wherein the deployed executable is written in bytecode, which has been produced from the source code, wherein the runtime environment uses an interpreter to execute the bytecode of the deployed executable.

7. The method of claim 1, wherein the digitally encoded data is metadata of the deployed executable.

8. The method of claim 1, further comprising:
    synchronizing deployed executable with the source code in a source code repository of the development environment.

9. The method of claim 1, further comprising:
    generating the deployed executable from the source code;
    generating a development executable from the source code, wherein the development executable executes in the development environment, wherein the digitally encoded information maps the development executable to the source code and to the deployed executable;
    determining differences, if any, between the deployed executable and the development executable using the digitally encoded information; and
    reporting the differences within a graphical user interface.

10. The method of claim 1, wherein said digitally encoded information is metadata of the deployed executable, said method further comprising:
    storing versioning information for the source code and the deployed executable in a versioning repository of a versioning system, wherein the versioning system is configured to perform a plurality of different change management actions, said change management actions comprising at least one of a check-in action, a check-out action, a synchronization action, and a deployment action, wherein said metadata of the deployed executable is automatically updated responsive to an occurrence of any of the different change management actions involving the source code or artifacts produced from the source code.

11. A system for synchronizing distributed systems comprising:
a central processing unit (CPU);
a non-transitory computer-readable medium storing program instructions, wherein the central processing unit (CPU) executes the program instructions;
a versioning engine, comprising a subset of the program instructions, able to version source code of a development environment and able to map the versions of source code to versions of deployed executables of a runtime environment, wherein each of the versions of the deployed executables are generated from the version of the source code to which it is mapped, wherein the development environment and the runtime environment are two distinct and separate computing environments that are isolated from each other;
a reconciliation component, comprising a subset of the program instructions, able to:
link the deployed executables to one or more files wherein the one or more files correspond to versioned documents of source code;
record one or more updated versions of the source code, wherein the one or more updated versions of the source code are resulted due to changes in the source code within the development environment;
compute differences between the one or more updated versions of the source code and the set of one or more files;
identify version conflicts between the source code and the deployed executable based on the computed differences; and
synchronize changes between the development environment and the deployed executable so that changes relating to the source code and the deployed executable are maintained in the digitally encoded data, which is automatically updated as the synchronized changes are made.

12. The system of claim 11, wherein the versioning engine stores information in a versioning repository, wherein the versioning repository maintains development code information, which includes information for source code and development executables, wherein the development executables are mapped to the deployment executables.

13. The system of claim 11, wherein the versioning engine stores information in a versioning repository, wherein the versioning repository maintains source code versioning information for the development environment, wherein each of the deployed executables comprises metadata, wherein the metadata links the deployed executable comprising the metadata to at least a version of the source code from which the deployed executable was generated.

14. The system of claim 13, wherein change revision history for each deployed asset and the source code is contained within the metadata.

15. The system of claim 11, further comprising:
a reconciliation component configured to automatically synchronize source code versions and development executables generated from the source code versions with corresponding ones of the deployed executables, wherein the reconciliation component synchronizes the source code based on the identified version conflicts.

16. The system of claim 11, further comprising:
a notification engine able to perform a notification action in response to a modification enacted upon at least one of the deployed executable and corresponding development code, wherein development code comprises source code from which the deployed executable was generated and at least one development executable able to execute in the development environment, where the development executable was also generated from the source code.

17. The system of claim 11, further comprising:
a mapping table comprising of deployment metadata, wherein the deployment metadata is revision information associated with the deployed executable, the runtime environment associated with the deployed executable and with corresponding development code.

18. A computer program product comprising a computer readable non-transitory storage medium having computer usable program code embodied therewith, the computer usable program code that when run by a computing device is operable to:
map source code of a development environment to a deployed executable of a runtime environment, wherein the mapping ensures that a version of source code from which the deployed executable was produced is always known, wherein the mapping occurs within digitally encoded data stored in a non-transient storage medium, and wherein the development environment and the runtime environment are two distinct and separate computing environments that are isolated from each other;
link the deployed executables to one or more files wherein the one or more files correspond to versioned documents of source code;
record one or more updated versions of the source code, wherein the one or more updated versions of the source code are resulted due to changes in the source code within the development environment;
compute differences between the one or more updated versions of the source code and the set of one or more files;
identify version conflicts between the source code and the deployed executable based on the computed differences; and
synchronize changes between the development environment and the deployed executable so that changes relating to the source code and the deployed executable are maintained in the digitally encoded data, which is automatically updated as the synchronized changes are made.

19. The computer program product of claim 18, wherein the source code is human readable code written in text in accordance with a computer program language, wherein the deployed executable is machine readable code able to perform a set of tasks according to encoded instructions when run by a machine.

* * * * *